United States Patent
Glickshtein

(10) Patent No.: US 11,582,043 B2
(45) Date of Patent: Feb. 14, 2023

(54) SYSTEMS, APPARATUS AND METHODS FOR BACKING UP AND AUDITING DISTRIBUTED LEDGER DATA WITHIN A NETWORK AND SECURELY WITHOUT USING PRIVATE KEYS

(71) Applicant: EYGS LLP, London (GB)

(72) Inventor: Aminadav Glickshtein, Jerusalem (IL)

(73) Assignee: EYGS LLP, London (GB)

( * ) Notice: Subject to any disclaimer, the term of this patent is extended or adjusted under 35 U.S.C. 154(b) by 221 days.

(21) Appl. No.: 16/849,005

(22) Filed: Apr. 15, 2020

(65) Prior Publication Data
US 2020/0328899 A1 Oct. 15, 2020

Related U.S. Application Data

(60) Provisional application No. 62/833,913, filed on Apr. 15, 2019, provisional application No. 62/834,057, filed on Apr. 15, 2019.

(51) Int. Cl.
*H04L 9/32* (2006.01)
*G06Q 20/06* (2012.01)
(Continued)

(52) U.S. Cl.
CPC ........ *H04L 9/3239* (2013.01); *G06F 16/2365* (2019.01); *G06F 16/2379* (2019.01);
(Continued)

(58) Field of Classification Search
CPC ......... H04L 9/3239; H04L 69/22; H04L 9/50; G06F 16/2379; G06F 16/2365; G06Q 20/06; G06Q 2220/20
See application file for complete search history.

(56) References Cited

U.S. PATENT DOCUMENTS 9,397,985 B1 7/2016 Seger, II et al.
9,608,829 B2 3/2017 Spanos et al.
(Continued)

FOREIGN PATENT DOCUMENTS

CN 107274184 A 10/2017
CN 106598824 B 11/2018
(Continued)

OTHER PUBLICATIONS

International Search Report and Written Opinion for International Application No. PCT/EP2020/060629, dated Jun. 25, 2020, 9 pages.
(Continued)

*Primary Examiner* — Duc C Ho
(74) *Attorney, Agent, or Firm* — Cooley LLP

(57) ABSTRACT

In some embodiments, a method includes generating, based on distributed ledger data associated with a first distributed ledger-based network (DLN), distributed ledger data associated with a second DLN. The first DLN and the second DLN each is a fork and the distributed ledger data associated with the first DLN include account data associated with a set of accounts. The method includes generating a request to initiate a transaction between a first account and a second account. The method includes authenticating the transaction based on a protocol associated with the second DLN and without using a private cryptographic key of the first account. The method includes sending a signal indicating the transaction was authenticated and storing information associated with the transaction in the distributed ledger data associated with the second DLN.

20 Claims, 4 Drawing Sheets

(51) Int. Cl.
*H04L 69/22* (2022.01)
*G06F 16/23* (2019.01)
*H04L 9/00* (2022.01)

(52) U.S. Cl.
CPC ............ *G06Q 20/06* (2013.01); *H04L 69/22* (2013.01); *G06Q 2220/00* (2013.01); *H04L 9/50* (2022.05)

(56) References Cited

U.S. PATENT DOCUMENTS

| | | | |
|---|---|---|---|
| 9,785,369 | B1 | 10/2017 | Ateniese et al. |
| 9,794,074 | B2 | 10/2017 | Toll et al. |
| 9,870,508 | B1 | 1/2018 | Hodgson et al. |
| 9,881,176 | B2 | 1/2018 | Goldfarb et al. |
| 9,906,513 | B2 | 2/2018 | Wuehler |
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 10,721,069 | B2 | 7/2020 | Konda et al. |
| 10,825,295 | B2 | 11/2020 | Simons |
| 10,833,861 | B2 | 11/2020 | Chari et al. |
| 10,951,409 | B2 | 3/2021 | Konda et al. |
| 11,146,399 | B2 | 10/2021 | Westland et al. |
| 11,188,977 | B2* | 11/2021 | Youb ............ H04L 9/3213 |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0161829 | A1 | 6/2017 | Mazier |
| 2017/0163733 | A1 | 6/2017 | Grefen et al. |
| 2017/0278100 | A1 | 9/2017 | Kraemer et al. |
| 2017/0293503 | A1 | 10/2017 | Curtis |
| 2017/0346639 | A1 | 11/2017 | Muftic |
| 2018/0048461 | A1 | 2/2018 | Jutla et al. |
| 2018/0077122 | A1 | 3/2018 | Hoss et al. |
| 2018/0101701 | A1 | 4/2018 | Barinov et al. |
| 2018/0137465 | A1 | 5/2018 | Batra et al. |
| 2018/0139043 | A1 | 5/2018 | Jayachandran et al. |
| 2018/0158036 | A1 | 6/2018 | Zhou et al. |
| 2018/0165131 | A1 | 6/2018 | O'Hare et al. |
| 2018/0189753 | A1 | 7/2018 | Konda et al. |
| 2018/0191503 | A1* | 7/2018 | Alwar ............ H04L 9/3297 |
| 2018/0218176 | A1 | 8/2018 | Voorhees et al. |
| 2018/0285217 | A1 | 10/2018 | Smith et al. |
| 2018/0294967 | A1 | 10/2018 | Roberts et al. |
| 2018/0343114 | A1 | 11/2018 | Ben-Ari |
| 2019/0012660 | A1 | 1/2019 | Masters |
| 2019/0012662 | A1 | 1/2019 | Krellenstein et al. |
| 2019/0034923 | A1 | 1/2019 | Greco et al. |
| 2019/0102756 | A1 | 4/2019 | Zhou et al. |
| 2019/0158275 | A1 | 5/2019 | Beck |
| 2019/0164153 | A1 | 5/2019 | Agrawal et al. |
| 2019/0165943 | A1 | 5/2019 | Chari et al. |
| 2019/0173854 | A1 | 6/2019 | Beck |
| 2019/0190701 | A1 | 6/2019 | Mitra et al. |
| 2019/0238525 | A1 | 8/2019 | Padmanabhan et al. |
| 2019/0286102 | A1 | 9/2019 | Carbone et al. |
| 2019/0299105 | A1 | 10/2019 | Knight et al. |
| 2019/0303541 | A1 | 10/2019 | Reddy et al. |
| 2019/0370792 | A1 | 12/2019 | Lam |
| 2020/0013118 | A1 | 1/2020 | Treat et al. |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0067907 | A1 | 2/2020 | Avetisov et al. |
| 2020/0074518 | A1 | 3/2020 | Kumaraswamy et al. |
| 2020/0076615 | A1 | 3/2020 | Redpath et al. |
| 2020/0127833 | A1 | 4/2020 | Konda et al. |
| 2020/0127834 | A1 | 4/2020 | Westland |
| 2020/0159847 | A1 | 5/2020 | Smith et al. |
| 2020/0160319 | A1 | 5/2020 | Smith et al. |
| 2020/0175623 | A1* | 6/2020 | Howie ............ G01S 19/01 |
| 2020/0193425 | A1 | 6/2020 | Ferenczi et al. |
| 2020/0193429 | A1 | 6/2020 | Babar et al. |
| 2020/0234386 | A1 | 7/2020 | Blackman et al. |
| 2020/0275273 | A1 | 8/2020 | Smith et al. |
| 2020/0322154 | A1 | 10/2020 | Konda et al. |
| 2020/0327100 | A1 | 10/2020 | Androulaki et al. |
| 2020/0327112 | A1 | 10/2020 | Glickshtein |
| 2020/0328890 | A1 | 10/2020 | Connor |
| 2020/0328894 | A1 | 10/2020 | Baker |
| 2020/0410460 | A1 | 12/2020 | Nissan et al. |

FOREIGN PATENT DOCUMENTS

| | | |
|---|---|---|
| CN | 109359948 A | 2/2019 |
| WO | WO 2017/187395 | 11/2017 |
| WO | WO 2018/007828 | 1/2018 |
| WO | WO 2018/028777 | 2/2018 |
| WO | WO 2018/144302 | 8/2018 |
| WO | WO-2019180702 A1 | 9/2019 |

OTHER PUBLICATIONS

Office Action for U.S. Appl. No. 16/283,452, dated Jul. 10, 2019, 31 pages.

Office Action for U.S. Appl. No. 16/283,452, dated Nov. 6, 2019, 34 pages.

International Search Report and Written Opinion for International Application No. PCT/US2019/046532, dated Dec. 2, 2019, 10 pages.

International Search Report and Written Opinion for International Application No. PCT/US2019/046808, dated Dec. 2, 2019, 9 pages.

International Search Report and Written Opinion for International Application No. PCT/US2019/057246, dated Feb. 4, 2020, 8 pages.

Office Action for U.S. Appl. No. 16/659,335, dated Apr. 23, 2020, 12 pages.

Office Action for U.S. Appl. No. 16/659,335, dated Aug. 13, 2020, 15 pages.

International Search Report and Written Opinion for International Application No. PCT/US2019/057262, dated Jan. 24, 2020, 9 pages.

International Search Report and Written Opinion for International Application No. PCT/EP2020/060610, dated Jul. 27, 2020, 17 pages.

Invitation to Pay Additional Fees and Partial International Search Report for International Application No. PCT/EP2020/060623, dated Jun. 17, 2020, 12 pages.

International Search Report and Written Opinion for International Application No. PCT/EP2020/060623, dated Aug. 7, 2020,16 pages.

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

Bunz, B. et al., "Zether: Towards privacy in a smart contract world," IACR, International Association for Cryptologic Research, vol. 20190226:031535, Feb. 20, 2019, Retrieved from the Internet: <URL:http://eprint.iacr.org/2019/191.pdf>, Retrieved on Feb. 20, 2019, 49 pages.

Ben-Sasson, E. et al., "Scalable, transparent, and post-quantum secure computational integrity," Cryptology ePrint Archive, Report 2018/046 (2018), 83 pages.

Clifton, M., "Understanding Merkle Trees—Why use them, who uses them, and how to use them," [Online], www.codeproject.com, pp. 1-31 (2017).

Dinh, T. T. A. et al., "Blockbench: A framework for analyzing private blockchains," [Online], Retrieved from the Internet: <URL: https://arxiv.org/abs/1703.04057>arXiv:1703.04057v1, Mar. 12, 2017, 16 pages.

Khalil, R. et al., "NOCUST—A securely scalable commit-chain," Feb. 15, 2019, Retrieved from the Internet: <URL:https://eprint.iacr.org/eprint-bin/getfile.plentry=2018/642&version=20190215:182502&file=642.pdf>, Retrieved on Mar. 10, 2020, 27 pages.

Lee, C. H. et al., "Implementation of IoT system using blockchain with authentication and data protection," 2018 International Conference on Information Networking (ICOIN), IEEE, Jan. 10, 2018, pp. 936-940.

(56) References Cited

OTHER PUBLICATIONS

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 2019, pp. 50-55.

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

Kosba, A. et al., "Hawk: The Blockchain Model of Cryptography and Privacy-Preserving Smart Contracts," 2016 IEEE Symposium on Security and Privacy, May 2016, pp. 839-858.

International Search Report and Written Opinion for International Application No. PCT/EP2020/060626, dated Sep. 3, 2020, 12 pages.

Magazzeni, D. et al., "Validation and verification of smart contracts: A research agenda," Computer, vol. 50, No. 9, Sep. 2017, pp. 50-57.

Office Action for U.S. Appl. No. 16/383,845, dated Apr. 25, 2022, 13 pages.

Office Action for U.S. Appl. No. 16/383,845, dated Sep. 29, 2021, 11 pages.

Office Action for U.S. Appl. No. 16/534,858, dated Jun. 23, 2021, 11 pages.

Office Action for U.S. Appl. No. 16/848,284, dated Mar. 10, 2022, 11 pages.

Xu, L. et al., "DL-BAC: Distributed Ledger Based Access Control for Web Applications," 2017 International World Wide Web Conference Committee (IW3C2), WWW'17 Companion, Apr. 3-7, 2017, Perth, Australia; pp. 1445-1450.

Office Action for U.S. Appl. No. 16/542,701, dated Jun. 9, 2022, 28 pages.

Trufflesuite | Ganache, retrieved online on Sep. 22, 2022, <https://github.com/trufflesuite/ganache/commit/332be605d 3>, committed on Sep. 28, 2016.

\* cited by examiner

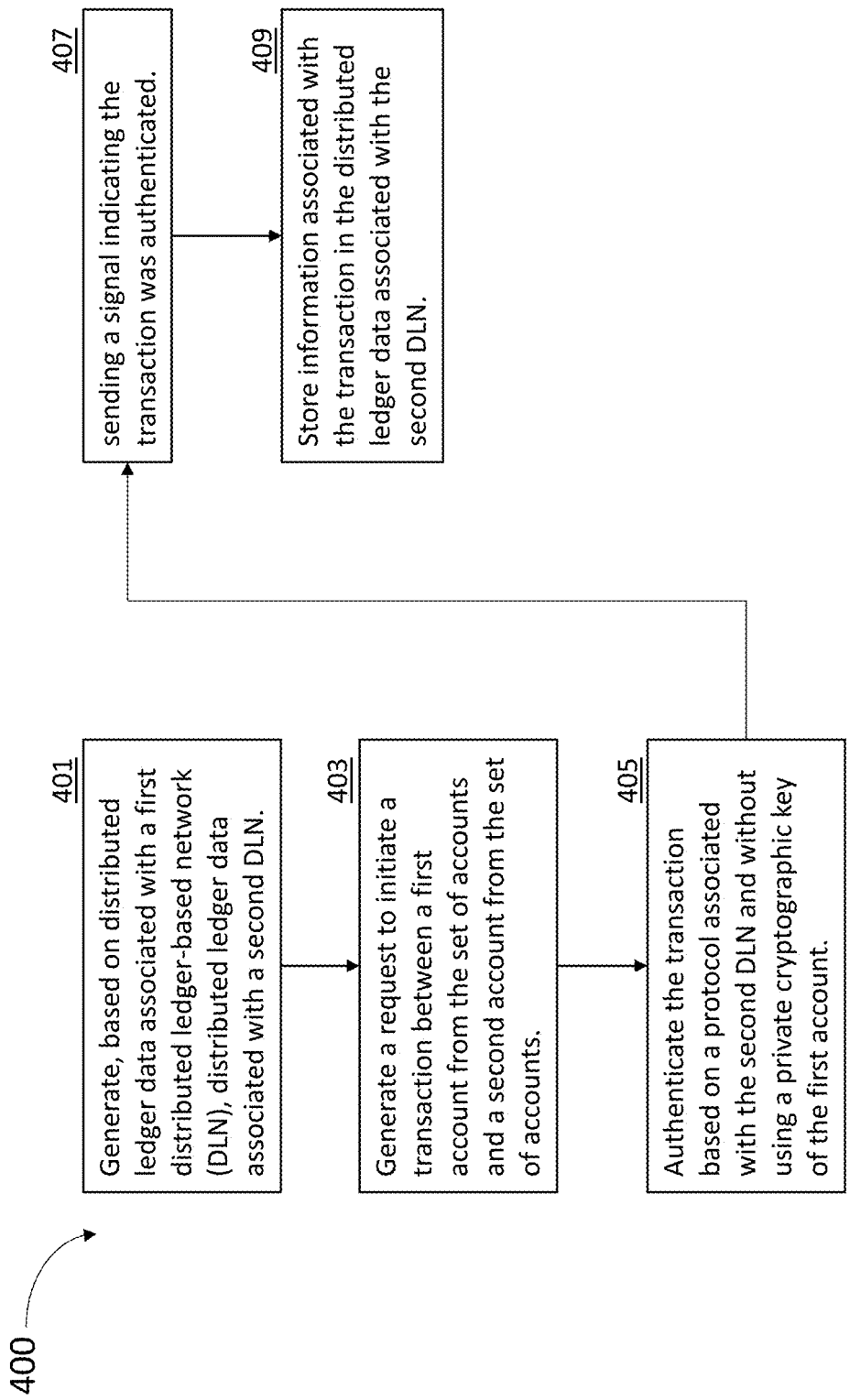

SYSTEMS, APPARATUS AND METHODS FOR BACKING UP AND AUDITING DISTRIBUTED LEDGER DATA WITHIN A NETWORK AND SECURELY WITHOUT USING PRIVATE KEYS

CROSS-REFERENCE TO RELATED APPLICATION

This application is a non-provisional of and claims priority under 35 U.S.C. § 119 to U.S. provisional application Ser. No. 62/833,913, filed on Apr. 15, 2019, and entitled "Systems, Apparatus and Methods for Forking Distributed Ledger Data Within a Network and Securely Without Using Private Keys," and U.S. Provisional Patent Application No. 62/834,057, filed on Apr. 15, 2019, and entitled "Systems, Apparatus and Methods for Local State Storage of Distributed Ledger Data Without Cloning," the contents of which are incorporated herein by reference in their entirety.

BACKGROUND

Some embodiments described herein relate generally to distributed ledger data. In particular, but not by way of limitation, some embodiments described herein relate to systems, apparatus, and methods for backing up and auditing distributed ledger data within a network and securely without using private keys.

A distributed ledger is a consensus of replicated and synchronized data geographically shared across multiple notes on a network. Without using a centralized data storage, each distributed ledger database replicates and saves an identical copy of the ledger and updates itself independently. A distributed ledger may employ executing codes, also known as smart contracts, to manage transactions and permit trusted transactions to be carried out among disparate, anonymous parties without the need for a central authority. Private keys (also known as private encryption keys) are typically used to sign such transactions for authentication purposes. Thus, the private keys are only known to its user and are not shared among users to ensure security.

Accordingly, a need exists for analyzing distributed ledger data without using private keys of individual users.

SUMMARY

In some embodiments, a method includes generating, based on distributed ledger data associated with a first distributed ledger-based network (DLN), distributed ledger data associated with a second DLN. The first DLN and the second DLN each is a fork and the distributed ledger data associated with the first DLN include account data associated with a set of accounts. The method includes generating a request to initiate a transaction between a first account from the set of accounts and a second account from the set of accounts. The method includes authenticating the transaction based on a protocol associated with the second DLN and without using a private cryptographic key of the first account. The protocol associated with the second DLN is different from a protocol associated with the first DLN. The method includes sending a signal indicating the transaction was authenticated and storing information associated with the transaction in the distributed ledger data associated with the second DLN.

BRIEF DESCRIPTION OF THE FIGURES

FIG. 4 is a flow chart illustrating a block of distributed ledger data in a forked distributed ledger-based network, according to some embodiments.

DETAILED DESCRIPTION

Figure 1:
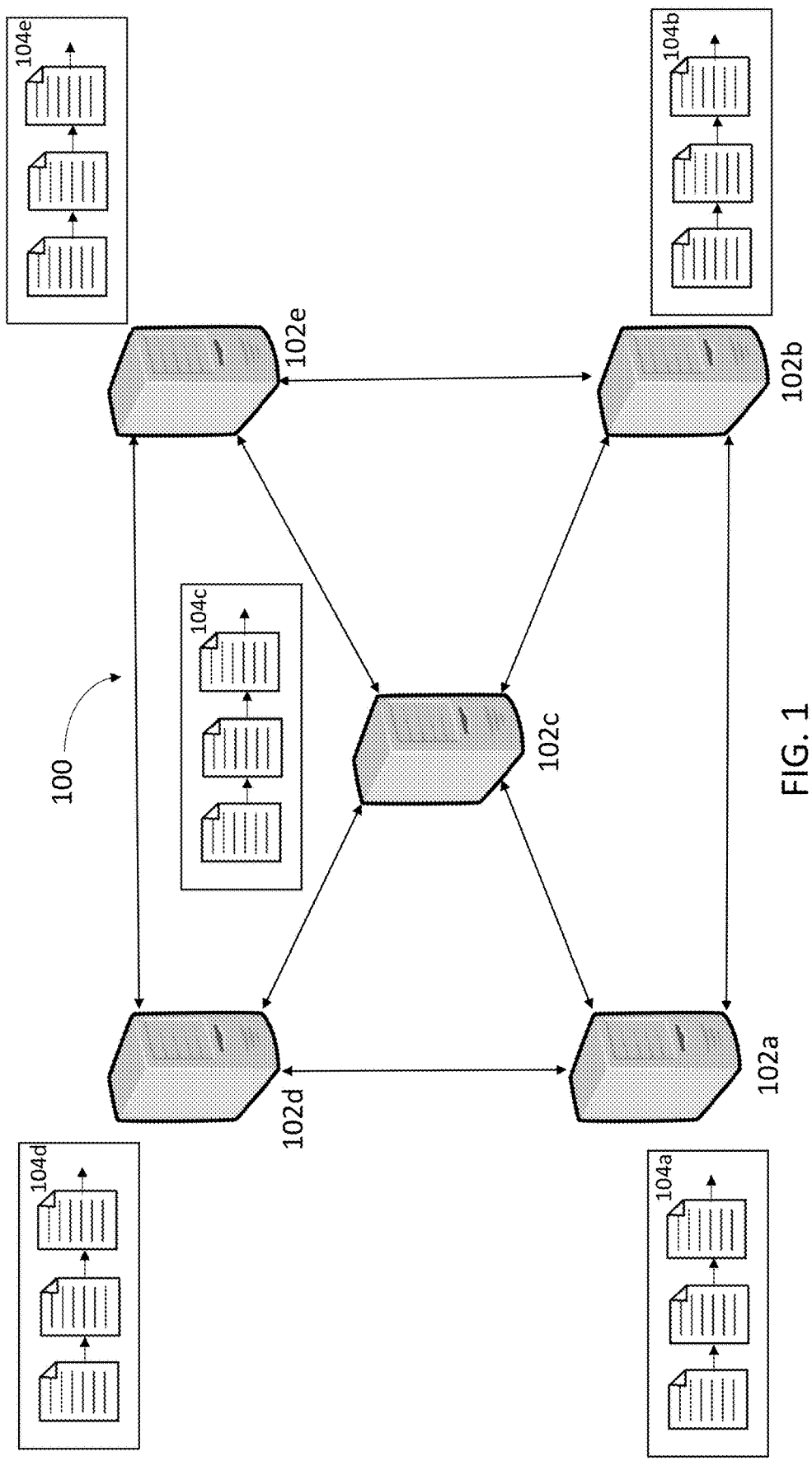
FIG. 1 shows a distributed ledger-based network configured for use in conducting transactions between two participants of the distributed ledger-based network (DLN), according to some embodiments.

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale (e.g., private sale) of a digital music file can use a self-executing code or program (e.g., a smart contract) on the DLN to manage the sale of the music file. The self-executing code or smart contract can regulate the exchange of the music file and the correct payment (e.g., crypto-currency) for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain or blockchain network. In some embodiments, the terms "distributed ledger-based network" and "blockchain network" herein may be used interchangeably. Similarly, in some embodiments, the terms "self-executing code" or "self-executing code segment" and "smart contract" may be used interchangeably. A smart contract is a computer protocol intended to digitally facilitate, verify, or enforce the negotiation or performance of an agreement. Smart contracts allow the performance of credible transactions without third parties. A smart contract includes a set of contractual terms of the agreement between buyers and sellers and these contractual terms of the agreement are directly written into lines of self-executing code. The self-executing code and the agreements contained therein exist across distributed ledger-based network (DLN) (e.g., separate instances stored at multiple locations within the DLN). The self-executing code controls the execution of transactions, which are trackable and irreversible. These contractual terms of the agreement in smart contracts may also be referred to as a "protocol," or "predefined rules." Some example predefined rules include rules to govern and validate transactions, an algorithm that defines the mechanisms for all participating nodes to interact with each other, and, in some instances, application programming interface. For example, a music streaming platform can set up a smart contract to decentralize the collection of revenues and have a proper allocation of revenue payments to each music creator. An example of a predefined rule in this smart contract is that the ownership of a song is to be validated before dispersing royalty payment to the song's creator. Another example of a predefined rule in this smart contract is that for every $1000 of music sold, the musician gets an average royalty of $20.

Further, in some embodiments, the term "transaction" may be used to refer, without limitations, to off-chain transactions (e.g., transactions involving the sale of physical or digital assets between parties) and/or on-chain representation of these off-chain transactions (e.g., the transaction of tokens that represent the assets on the blockchain network). In some embodiments, the term "transaction" may also be used to refer to transactions that occur on the DLN (e.g., transfer of tokens such as but not limited to cryptocurrency between accounts on the DLN). In some embodiments, the terms "off-chain" or "off-the DLN" are to be understood to refer to states or actions that are not occurring "on the blockchain network" or "on the DLN." For example, a statement such as "the data is stored off-the DLN" is to be understood to refer to the state of "the data not being stored on the storage system(s) of, or not being controlled by, the DLN (and is instead stored at or controlled by systems elsewhere, i.e., on a storage system that is not on the DLN.)

In some embodiments, as noted above, smart contracts may be used to manage transactions or interactions on DLNs between multiple DLN participants without the need for a central authority to oversee the transactions. For example, a smart contract may receive a request from a first participant ("sender") to transfer some tokens from a DLN account of the first participant to a DLN account of a second participant ("recipient"). Upon receiving the request, in some implementations, the smart contract may initiate the transfer process, i.e., the process of adjusting the token balances of the DLN accounts of the sender and the recipient as specified in the transfer request and according to any rules that may be applicable to the transaction, the DLN accounts of the sender and/or recipient, etc. For example, the DLN account of the sender may be subject to a blackout period during which no tokens may be transferred out of the account. In such cases, the smart contract may reject the transfer request or wait until the blackout period is over before proceeding with transferring the tokens. In some cases, the DLN account of the sender may not be allowed to transfer a pre-determined number of tokens inside of or outside of a predefined period. As another example, a rule may include a list of accounts to which tokens from the DLN accounts of the sender can or cannot be transferred, resulting in the smart contract accepting or rejecting the transfer request, respectively.

Accordingly, in some embodiments, the use of smart contracts to manage transactions on DLNs may effectively limit the account rights of DLN account owners. In some embodiments, the term "account owner" may refer to a participant of the DLN that owns or has access to the private key of an account on the DLN (e.g., such an account owner may be able to sign transactions that involve the account with the private key of the account). In some implementations, having ownership of, or access to, a private key of an account on the DLN, however, may not indicate that the account owner also has full rights as they relate to the account. For example, as discussed above, there may be restrictions on actions that an account owner can take with respect to his/her DLN account due to smart contract rules that may apply to the actions and/or the account. For instance, the account owner may be blocked from transferring tokens from her/his account via a smart contract even if the tokens exist in the account and she/he has authorized the transaction (e.g., the transfer of the tokens) with a valid private key. In such implementations, an entity (e.g., a reviewer, an auditor, and/or the like) that is tasked with reviewing transactions and accounts involved therewith may wish to review or analyze not only information related to the transactions and the related accounts (e.g., information related to the tokens in the accounts and/or transferred between accounts, the transaction participants, etc.), but also the behavior of the smart contract as it relates to the transactions and the related accounts (e.g., any rules that may apply to the transactions and related accounts).

For example, a participant of the DLN (e.g., company, individual, etc.) may engage an auditor to audit or review the participant's transactions and accounts involved therewith, and the auditor may wish to determine, for instance, the extent of the tokens that exist in the accounts. Further, in some implementations, the auditor may also wish to determine the extent of the rights the participant may have over the tokens in the accounts (besides, for instance, the participant's ownership of, or access to, the private keys of the accounts). That is, the auditor may wish to determine any limitations that may be placed on the tokens contained within the accounts (for example, due to smart contract rules). In such embodiments, to audit or review the accounts, the auditor may initially analyze the functionalities of the smart contract(s) of the DLN. For example, to audit the existence of the tokens in the accounts, the auditor may wish to establish that the smart contract, when activated by the auditor, can accurately determine or call the balance or immediate availability of tokens contained in the accounts. As another example, the auditor may wish to identify any smart contract rules that apply to the tokens to audit any restrictions that may be attached to the accounts (and tokens contained therein). Embodiments described herein can be implemented by any entities aiming to explore the behavior of smart contracts, including, but not limited to, reviewing or auditing participant's transactions and accounts, penetration testing (a simulated cyber-attack on a computer system, performed to evaluate the security of the system), and/or other system security testing. Thus, although some embodiments are described herein in the context of auditing transactions and accounts, it should be understood that such embodiments can also be used in non-auditing contexts such as penetration testing, etc.

An auditor may employ one or more techniques to analyze the functionalities of the smart contract of the DLN to establish that the smart contract, when activated by the auditor, can accurately determine or call the balance or immediate availability of tokens in accounts and/or to determine the presence of any smart contract rules that may apply to tokens in the accounts. For example, the auditor may request the purported account owner ("auditee") to transfer the tokens to a predetermined account as a demonstration of the owner's ability to transfer the tokens—that is, as a demonstration that the tokens exist in the account, the owner has the private key to the account, there are no smart contract rules limiting or restricting the owner's rights over the tokens, and/or etc. Such a technique, however, may be cumbersome and costly (e.g., in the form of transaction fees) for the auditee, as well as being unscalable for the auditor.

In some instances, the auditor may fork the DLN (i.e., obtain a full copy of the first DLN, including stored smart contract data related to all transactions recorded on the distributed ledgers of the first DLN since the inception of the first DLN) and transfer the tokens in the auditee's account in the forked DLN (i.e., without affecting the first DLN) to another account as the above-noted demonstration. In some embodiments, a fork or a forked DLN (or the second DLN) implements a different protocol from the protocol associated with the original DLN (or the first DLN). In some instances, the protocol of the forked DLN may include rules that are same as the rules in the protocol of the original DLN, and also includes rules that are different from the rules in the protocol of the original DLN. The forked DLN can be a soft fork or a hard fork. In some implementations, when the computing nodes in the original DLN execute transactions only based on the protocol associated with the original DLN and not based on the new protocol in the forked DLN, the forked DLN can be referred to as a soft fork.

In the forked DLN, participants can transact with each other using forked tokens from a DLN account of a first participant to a DLN account of a second participant. To transfer the tokens in the account of the forked DLN, however, in some cases, the auditor may have to have access to the private keys of the account owners, which may not be desirable for both the auditor and the auditee (e.g., due to security and liability reasons). Thus, a need exists for determining information (including, but not limited to, the balance, the availability, and the limitations) of tokens in an account and acting on the tokens without the knowledge of the private key of the account owner.

In some embodiments, the forked DLN can set new protocols or rules different from the first DLN. For example, in the first DLN, an account owner (or the auditee) can be required to sign each transaction with its private key to authenticate itself. Specifically, based on the known protocols in the first DLN, each transaction has a header including a "From" field (e.g., the origination address of that transaction) and a "To" field (e.g., a destination address of the transaction). The "To" field includes an identifier of the recipient of the transaction. The "From" field is derived based on the signature of the sender of the transaction when the sender of the transaction signs the transaction using its private keys.

In the forked DLN, the auditor can set new protocols that do not require each transaction to be signed. In some implementations, the "From" field (e.g., the origination address of that transaction) in the header of each transaction is provided by the sender of that transaction. In other words, the sender of the transaction can set its own "From" address (e.g., a number, a text string, a symbol, an identifier, and/or the like). The auditor DLN client can approve the transaction without using a signature of the sender or having the sender sign the transaction with its private keys. Accordingly, analyzing the distributed ledger data (or auditing the functionalities of the smart contracts) can be achieved with flexibility and scalability.

In some embodiments, a method includes generating, based on distributed ledger data associated with a first distributed ledger-based network (DLN), distributed ledger data associated with a second DLN. The first DLN and the second DLN each is a fork and the distributed ledger data associated with the first DLN include account data associated with a set of accounts. The method includes generating a request to initiate a transaction between a first account from the set of accounts and a second account from the set of accounts. The method includes authenticating the transaction based on a protocol associated with the second DLN and without using a private cryptographic key of the first account. The protocol associated with the second DLN is different from a protocol associated with the first DLN. The method includes sending a signal indicating the transaction was authenticated and storing information associated with the transaction in the distributed ledger data associated with the second DLN.

In some embodiments, the term "audit" can refer to but is not limited to a review of actions taken on a DLN, a review of participants of the DLN, a review of accounts on the DLN, and/or the like. For example, the actions may include transactions undertaken or represented on the DLN, such as but not limited to transactions between participants of the DLN. For instance, an "audit" of the transactions may include a review of the transaction data (e.g., for accuracy, completeness, and/or etc.). An audit or review of the participants may include, for example, a review of the participants' access to, ownership of, association with, and/or etc., with an account on the DLN. For instance, an "audit" of a participant on the DLN may include a review of the participant's credentials that the participant has access to, ownership of, association with, and/or etc., an account on the DLN. An audit or review of accounts on the DLN may include, for example, review of most or all information related to the accounts, including but not limited to contents of the accounts (e.g., assets such as but not limited to tokens contained therein), current and/or previous ownerships of the accounts, records related to the accounts, and/or the like. The term "auditor" may refer to the entity (e.g., person(s), companies, and/or etc.) performing the audit process as discussed above. In some implementations, an auditor may include entities that perform traditional auditing processes. In some implementations, an auditor may include entities that do not perform traditional auditing processes but may be provided access to review actions and/or accounts on the DLN, non-limiting examples of which include regulators, reviewers, observers, etc. In some implementations, the auditor may also be a participant of the DLN. The term "auditee" may refer to the entity (e.g., person(s), companies, and/or etc.) on the DLN that are involved in the transactions that are being audited, whose access to, ownership of, association with, and/or etc., to an account is being audited. In some cases, the auditee may also be a participant of the DLN.

FIG. 1 shows a distributed ledger-based network ("DLN") configured for use in conducting transactions between two participants of the DLN, according to some embodiments. In some embodiments, the DLN or blockchain network 100 includes multiple computing nodes 102a-102e configured to communicate among each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. operatively coupled to the processors. In some implementations, the P2P connections may be provided by wired and/or wireless communications systems or networks such as but not limited to the internet, intranet, local area networks (LANs), wide area networks (WANs), etc., utilizing wireless communication protocols or standards such as WiFi®, LTE®, WiMAX®, and/or the like.

In some embodiments, the DLN 100 may include self-executing codes or smart contracts that are configured to be executed upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate among each other with the results of the executions of their respective self-executing codes, for example, to arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions on the DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music file, etc. Further, the smart contract can facilitate the exchange of the music file by allowing the transfer of a payment to occur only after the transfer of the music file is completed (and validated). In some embodiments, the self-executing code or smart contract may also include rules that apply to the accounts involved in the transactions and interfere with the completion of the transactions. For example, with respect to the example of the digital music file above, the smart contract may include a rule restricting the supposed music buyer from transferring payment (e.g., tokens) for a period of time (e.g., until an investigation determines that none of the tokens are stolen, until the buyer reaches the age when she or he is allowed to access the music, etc.).

In some embodiments, the DLN 100 may be linked to one or more oracles (not shown) or data feeds that provide external data to the DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems, for example by serving as data transmission hubs.

In some embodiments, at least a substantial number of the computing nodes 102a-102e include copies of distributed ledger data (or a distributed ledger) 104a-104e onto which transactions that occur on the network are recorded. The recording of the transactions on the distributed ledger data 104a-104e may occur when some substantial proportion of the computing nodes 102a-102e, or a subset thereof, agree on the validity of the transactions. The distributed ledger data 104a-104e can be immutable or nearly immutable in the sense that to alter the distributed ledger data 104a-104e, at least this substantial portion of the computing nodes 102a-102e would have to agree, which can be increasingly difficult when the number of computing nodes 102a-102e is large (and the distributed ledger data 104a-104e gets longer).

Figure 2:
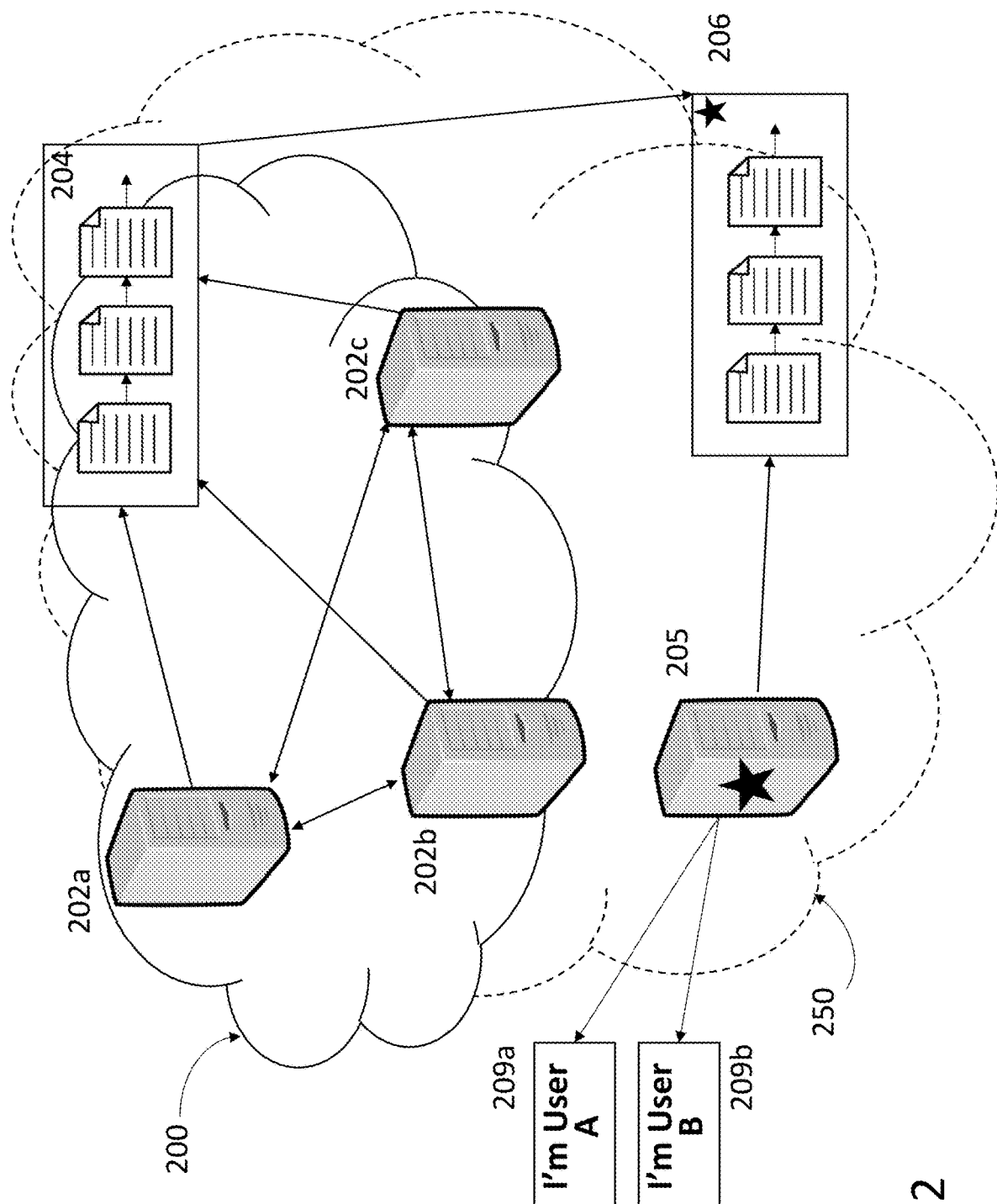
FIG. 2 shows a schematic diagram of analyzing distributed ledger data without using private keys, according to some embodiments.

FIG. 2 shows a schematic diagram of analyzing distributed ledger data without using private keys, according to some embodiments. In some embodiments, similar to the distributed ledger-based network (DLN) 100 shown in FIG. 1, the first DLN 200 (or the original DLN) includes multiple computing nodes 202a-202c configured to communicate among each other via a peer-to-peer (P2P) connection. The multiple computing nodes 202a-202c are functionally and structurally similar to the multiple computing nodes 102a-102e shown in FIG. 1. Each of the computing nodes 202a-202c can include a processor (not shown) and a memory (not shown) operatively coupled to the processor. The processor can be or include any processing device or component configured to perform the data collecting, processing and transmitting functions. The processor can be configured to, for example, write data into and read data from the memory, and execute the instructions stored within the memory. Processor can also be configured to execute and/or control, for example, the operations of the memory. The memory can be, for example, a random-access memory (RAM) (e.g., a dynamic RAM, a static RAM), a flash memory, a removable memory, and/or so forth. In some embodiments, the memory can include, for example, a database, process, application, virtual machine, and/or some other software modules (stored and/or executing in hardware) or hardware modules.

The first distributed ledger data 204 may include self-executing codes or smart contracts that are configured to execute upon fulfillment of predefined rules that are agreed upon between a set of accounts. For example, a predefined rule in a smart contract of a music streaming service is that the ownership of a song is to be validated before dispersing royalty payment to the song's creator. For another example, a predefined rule in this smart contract is that a seller of the music approves the transaction with the seller's private key before the transaction is processed. At least a substantial number of the computing nodes 202a-202c include copies of first distributed ledger data 204 onto which transactions that occur on the network are recorded. Similar to the distributed ledger data 104a-104e shown in FIG. 1, the first distributed ledger data 204 includes stored smart contract data related to all transactions recorded associated with a set of accounts on the first DLN 200 (for example, since the inception of the first DLN 200.) Each of the computing nodes 202a-202c is operatively coupled to the other computing nodes in the first DLN 200.

In some implementations, the auditor computing node 205 can include a processor (not shown) and a memory (not shown) operatively coupled to the processor. The processor can be or include any processing device or component configured to perform the data collecting, processing and transmitting functions. The processor can be configured to, for example, write data into and read data from the memory, and execute the instructions stored within the memory. Processor can also be configured to execute and/or control, for example, the operations of the memory. The memory can be, for example, a random-access memory (RAM) (e.g., a dynamic RAM, a static RAM), a flash memory, a removable memory, and/or so forth. In some embodiments, the memory can include, for example, a database, process, application, virtual machine, and/or some other software modules (stored and/or executing in hardware) or hardware modules.

In some implementations, an auditor computing node 205 (or a server) can generate, based on the first distributed ledger data 204 associated with the first DLN 200, second distributed ledger data 206 associated with a second DLN 250. The second distributed ledger data 206 is a forked copy of the first distributed ledger data 204 and it can include self-executing codes or smart contracts that are configured to execute upon fulfillment of conditions that are agreed upon between transacting parties. The first distributed ledger data 204 and the second distributed ledger data 206 include the substantially the same data when the second distributed ledger data 206 is generated.

In some implementations, the second distributed ledger data 206 include recordings of transactions that occur on the first DLN 200 before the first DLN 200 is forked (i.e., pre-fork transactions) as well as recordings of transactions that occur on the second DLN 250 after the first DLN 200 is forked (i.e., post-fork transactions). In some implementations, the post-fork transactions are executed for the auditing purposes (e.g., a review of participants' access to, ownership of, association with, and/or etc. with an account on the first DLN 200.) In some implementations, the first DLN 200 does not include the second distributed ledger data 206 or any copies of the second distributed ledger data 206. In such implementations, the second distributed ledger data 206 can only be stored at the second DLN 250, not the first DLN 200. The first distributed ledger data 204 can be stored at the first DLN 200 and the forked DLN 250.

Some or all of the computing nodes 202a-202c (and/or the memory associated with each computing node) may include copies of a self-executing code that self-execute upon fulfillment of the conditions. In some implementations, the computing nodes 202a-202c may communicate among each other and arrive at a consensus of the results of executing the codes. In some implementations, one or a few of the computing nodes 202a-202c may self-execute the codes and transmit the results to the rest of the computing nodes 202a-202c for confirmation. Each of the computing nodes 202a-202c and the auditor computing node 205 is operatively coupled to the other computing nodes in the second DLN 250.

In some implementations, the second DLN 250 includes the computing nodes 202a-202c and the auditor computing node 205 configured to generate the second distributed ledger data 206 (i.e., the forked copy of the first distributed ledger data 204). In some implementations, an account owner, who has ownership of, or access to, a private key of an account on the first DLN 200, may not have full rights to the tokens in its account. For example, as discussed above, there may be restrictions on actions that the account owner can take with respect to the account owner's account due to smart contract rules (or a protocol associated with the first DLN 200) that may apply to the actions and/or the account. For instance, the account owner may be blocked from transferring a certain number of tokens from account owner's account via a smart contract even if the tokens exist in the account and the account owner has authorized the transaction (e.g., the transfer of the tokens) with a valid private key. In such instances, an entity (e.g., a reviewer, an auditor, and/or the like) that is tasked with reviewing transactions and accounts involved with the first DLN may wish to review or analyze not only information related to the transactions and the related accounts (e.g., information related to the tokens in the accounts and/or transferred between accounts, the transaction participants, etc.), but also the behavior of the smart contract as it relates to the transactions and the related accounts (e.g., any rules that may apply to the transactions and related accounts).

In these instances, the auditor, operating the auditor computing node 205, may determine or verify information (including, but not limited to, the balance, the availability, and the limitations) of tokens in an account. The auditor computing node 205 can perform an action on a pre-determined number of tokens in the first account (or the second account) based on a second protocol associated with the second DLN 250 and without using a private cryptographic key of the first account. The auditor computing node 205 can set the second protocol (including a second set of rules) in the second DLN 250 which are different from the first protocol (including a first set of rules) associated with the first DLN 200. In the second DLN 250, the transactions do not need to be signed by the account owner using its private keys (or its private cryptographic key(s)). As discussed herein, a smart contract includes a set of contractual terms of the agreement between buyers and sellers and these contractual terms of the agreement are directly written into lines of self-executing code. The self-executing code and the agreements contained therein exist across distributed ledger-based network (DLN). The self-executing code controls the execution of transactions, which are trackable and irreversible. These contractual terms of the agreement in smart contracts may also be referred to as a "protocol," or "predefined rules."

In such implementations, the auditor computing node 205 can generate a request to perform an action on a number of tokens in the first account. For example, the auditor computing node 205 can generate a request for a transaction to transfer a pre-determined number of tokens from a first account from a set of accounts to a second account from the set of accounts, a request for holding a pre-determined number of tokens in the first account for a pre-determined period of time, and/or the like. The auditor computing node 205 can perform the action on the pre-determined number of tokens without using a private cryptographic key of the first account (or the second account). Specifically, the auditor computing node 205 can, for example, initiate a transaction of a set of tokens from a first account to a second account by setting an origination address in the header of the transaction. The auditor computing node 205 can set the origination address of the transaction to be different from the origination address of the first account holder, thus, alleviating the need of using the private cryptographic key of the first account. In other words, the auditor computing node 205 can approve the transaction from the first account without an approval (or signature) from the account holder of the first account. In some instances, the auditor computing node 205 can set the origination address of the transaction via a graphical user interface (not shown in FIG. 2).

In some instances, the auditor computing node 205 can set the origination address of the transaction to two different addresses, and the computing nodes 202a-202c may recognize the transaction to be originated from two different users. For example, the auditor computing node 205 can generate a second request to initiate a second transaction between the first account and the second account. The second request includes a second header having a second origination address associated with the first account different from the first origination address.

Figure 3:
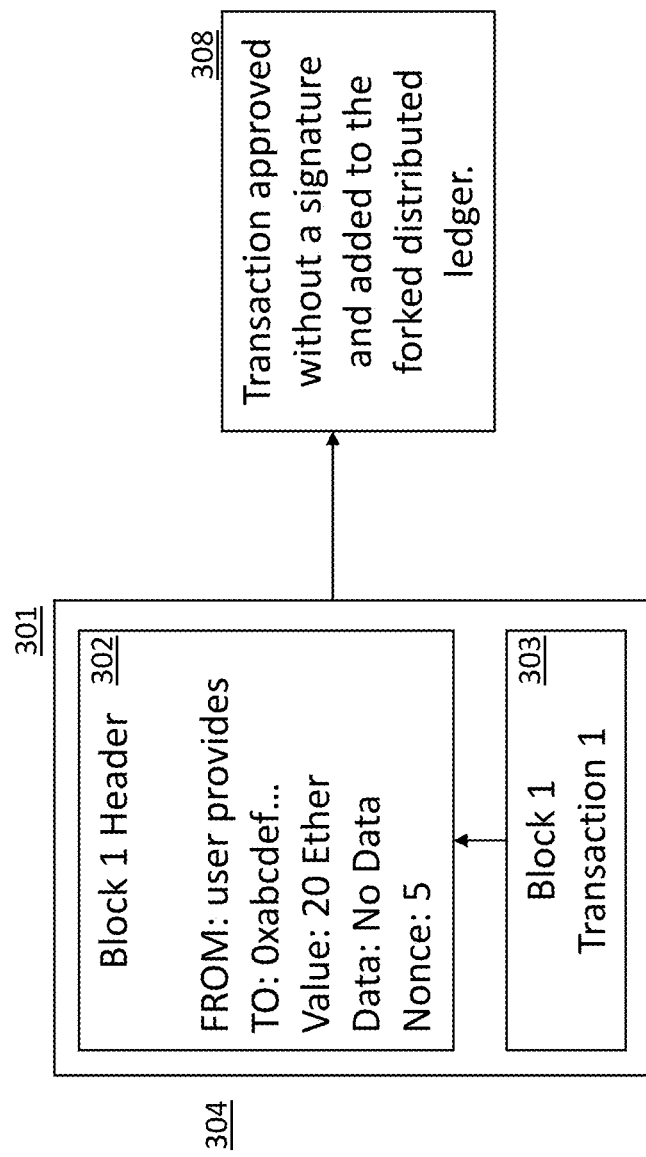
FIG. 3 shows a diagram illustrating a block of distributed ledger data in a forked distributed ledger-based network, according to some embodiments.

FIG. 3 shows a block diagram illustrating a block of distributed ledger data in the forked DLN, according to some embodiments. In some embodiments, a block 301 of the second distributed ledger data (e.g., 206 in FIG. 2) includes a block header 302 and a list of transactions 303 that are recorded on the block 301. The list of transactions 303 include recordings of post-fork transactions. In some implementations, for a post-fork transaction (e.g., an auditing transaction), the "From" field 304 (or the origination address) in the header 302 of each block is provided by the sender (i.e., the auditor computing node 205 in FIG. 2) of that transaction. In other words, the auditor computing node 205 in FIG. 2 can set its own "From" address 304 (e.g., a number, a text string, a symbol, an identifier, and/or the like) in a post-fork transaction. The auditor computing node 205 in FIG. 2 can choose an origination address different from the origination address of the first account. In some implementations, the auditor computing node 205 in FIG. 2 can provide different identifiers in the "From" fields of transactions and the computing nodes 202a-202c in the second DLN 250 may recognize it as different users (e.g., 209a in FIG. 2) and (e.g., 209b in FIG. 2). In other words, the auditor computing node 205 in FIG. 2 may initiate a first transaction with a first identifier in the "From" field of a first block header and a second transaction with a second identifier in the "From" field of a second block header. The auditor computing node 205 in FIG. 2 can approve the post-fork transaction 308 without using a signature of the account owner or having the account owner to sign the post-fork transaction with its private keys. The transaction 308 can then be added to the second distributed ledger data (e.g., 206 in FIG. 2).

An example code of implementing the method of analyzing the distributed ledger data without using private keys is shown below.

```
{
  setFromAddress(address)
    Validate that the transaction address is a valid wallet
      address.
    Set the from address of the transaction.
    Keep the from address in the transaction storage.
    returns if the address is a valid address.
  }
  sendTransaction( ) {
    Create a new raw transaction by using the object
      storage.
    Add the FROM address to the transaction.
    Execute the VM on the transaction and use the trans-
      action FROM address as msg.sender
    Every time the VM needs the sender, provide the sender
      from the storage.
    returns the transaction receipt.
  }
}
```

Returning to FIG. 2, in some implementations, the auditor computing node 205 may use data of the post-fork transactions and data of the pre-fork transactions to determine the audit status of an account. For example, an auditor may be tasked to review or audit the accounts and transactions of the first DLN 200 participant ("auditee"). Smart contracts may include rules that apply to the accounts, tokens contained within accounts and/or transactions involving the accounts, and as a result may effectively limit the account rights of the account owners. For instance, if the account owner or auditee claims to have a given number of tokens in an account (and even be able to demonstrate that the account carries the claimed number of tokens), the auditor may still wish to determine if there are any restrictions placed on the account and/or the tokens due to smart contract rules (e.g., an active transfer disable mode that may be applicable to the account and/or the tokens because the tokens were stolen, etc.). In such implementations, the auditor computing node 205 may analyze the data of the post-fork transactions stored in the second distributed ledger data 206 based on the smart contracts related to the pre-fork transactions stored in the second distributed ledger data 206. The audit status of the account can include, but is not limited to, for example the authentication of the claimed account owner, the authentication of the account, the balance of the tokens in the account, the account owner's rights and limitations to each token in the account, what actions (e.g., transfer, or hold) the account owner can perform to each token in the account, presence or absence of a specific rule on a token in the account, and/or the like.

Once the auditor computing node 205 determines or verifies the audit status (e.g., information including, but not limited to, the balance, the availability, and the limitations of tokens in the first account) of the first account, the auditor computing node 205 can send a signal (e.g., an audit report) to indicate or authenticate the transaction to transfer the requested tokens from the first account to the second account, or other actions that the auditor computing node 205 performed. In some instances, the auditor computing node 205 can send a signal to indicate the status of the audit process. In some implementations, the auditor computing node 205 can store the information associated with the transaction in the second distributed ledger data 206 associated with the second DLN 250 and generate an updated copy of the second distributed ledger data including the second distributed ledger data 206 and information associated with the transaction. In some instances, the auditor computing node 205 does not store the information associated with the transaction in the first distributed ledger data 204 associated with the first DLN 200. In some instances, the auditor computing node 206 can remove the second distributed ledger data 206 from its memory once the audit process is completed.

In some implementations, the auditor computing node 205 may be operatively coupled to the multiple computing nodes 202a-202c via the first DLN 200. Similar to the multiple computing nodes 202a-202c, the auditor computing node 205 can be configured to communicate with the multiple computing nodes 202a-202c to arrive at a consensus on the executions of the smart contracts. The auditor computing node 205 may store the first distributed ledger data 204 in its memory.

In some embodiments, forking the first DLN 200 for each account that is being audited would involve a large amount of resources (e.g., data storage, bandwidth, etc.). In some embodiments, the use of a smart contract state data storage module that stores (e.g., locally) modifications to smart contract data may allow the auditor to analyze the functionalities of the smart contracts of the DLN without forking the first DLN 200 for each account. Specifically, in some implementations, a block header in the first DLN 200 includes state data related to the transactions recorded on the first DLN 200. Examples of the information contained within the state data include status of accounts, and changes thereof, of accounts of the DLN 200, such as but not limited to, changes or state transitions of account balances as payments made from one account to another. For instance, the state data may include information related to the amount of tokens in the accounts of a token transferor (e.g., buyer of a product or service) and a token recipient (e.g., seller of the product or service) prior to, and/or subsequent to, the transfer of tokens as an agreed-upon payment. To avoid forking the first DLN 200 for each account with each state data change, a state data storage overlay that is linked or coupled to the a single forked DLN (e.g., 250) may be used to store state data changes that result when a smart contract is activated or triggered to execute a transaction (e.g., by an auditor testing the smart contract with a test transaction) such that the state data changes are not stored in the state data storage. As such, only the state data storage overlays (with less data (e.g., ~KB) and thus less storage space is needed) are stored for each state data change with a single forked DLN. In such implementations, multiple forked DLNs (e.g., data size of each forked DLN may be in a scale of GB) can be avoided and thus, less resources are needed for auditing. An example of the state data storage of the distributed ledger data is discussed in U.S. Provisional Patent Application No. 62/834,057, filed on Apr. 15, 2019 and entitled "Systems, Apparatus and Methods for Local State Storage of Distributed Ledger Data Without Cloning," the contents of which are incorporated herein by reference in its entirety.

In some embodiments, the systems, apparatus and methods disclosed herein allow an auditor to interact with a smart contract of a DLN without using account owners' private keys. This capability is in particular highly useful when there is a need to interact with the smart contract a significant number of times (e.g., when having to audit a large number of accounts or transactions on a DLN) since, among other reasons, accessing the private keys of account owners are not desirable for security and scalability reasons.

In some embodiments, the systems, apparatus and methods disclosed herein enable an auditor to audit an account on a DLN (for example, determine the balance of the account of the auditee) without having to actually transfer the tokens from the auditee's account. The benefits include, but are not limited to, desire to avoid transaction fees and/or difficulties that arise when there are, in particular, a large number of accounts to audit such as but not limited to high memory requirements, computer and network performance degradations, and/or etc.

FIG. 4 is a flow chart illustrating a process of forking distributed ledger data securely without using private keys, according to some embodiments. The method 400 can be executed at, for example, a processor of an auditor computing node such as the auditor computing node 205 in FIG. 2.

At 401, the method includes generating, based on the distributed ledger data associated with the first distributed ledger-based network (DLN), distributed ledger data associated with a second DLN. The first DLN includes multiple computing nodes configured to communicate among each other via a peer-to-peer (P2P) connection. The computing nodes in the first DLN may include a copy of the self-executing codes or smart contracts that are configured to be executed upon fulfillment of conditions that are agreed upon between transacting parties connected via the first DLN. The computing nodes in the first DLN may communicate among each other with the results of the executions of their respective self-executing codes, for example, to arrive at a consensus on the results. The first DLN may include a first protocol (or a first set of rules, a first smart contract) from a set of protocols that may include rules that apply to the accounts involved in the transactions. For example, the first protocol may include a rule requiring all sellers to sign each transaction with its private cryptographic key to authenticate and authorize the transaction.

The distributed ledger data associated with the second DLN (also referred to as the second distributed ledger data) is a forked copy of the distributed ledger data associated with the first DLN (also referred to as the first distributed ledger data). The second distributed ledger data include recordings of transactions that occur on the first DLN before the first DLN is forked (i.e., pre-fork transactions) as well as recordings of transactions that occur on the second DLN after the first DLN is forked (i.e., post-fork transactions). In some implementations, the post-fork transactions are executed for the auditing purposes (e.g., a review of participants' access to, ownership of, association with, and/or etc. with an account on the first DLN.) In some implementations, the first DLN does not include the second distributed ledger data or any copies of the second distributed ledger data. In such implementations, the second distributed ledger data can only be stored at the second DLN, not the first DLN. The first distributed ledger data can be stored at the first DLN and the forked DLN.

At 403, the method includes generating a request to initiate a transaction between a first account from the set of accounts and a second account from the set of accounts. An entity (e.g., a reviewer, an auditor, and/or the like) that is tasked with reviewing transactions and accounts involved with the first DLN may wish to review or analyze not only information related to the transactions and the related accounts (e.g., information related to the tokens in the accounts and/or transferred between accounts, the transaction participants, etc.), but also the behavior of the smart contract as it relates to the transactions and the related accounts (e.g., any rules that may apply to the transactions and related accounts). The auditor computing node can perform an action on a pre-determined number of tokens in the first account (or the second account) based on a second protocol associated with the second DLN and without using a private cryptographic key of the first account. For example, the auditor computing node can generate a request for a transaction to transfer a pre-determined number of tokens from a first account from a set of accounts to a second account from the set of accounts, a request for holding a pre-determined number of tokens in the first account for a pre-determined period of time, and/or the like.

At 405, the method includes authenticating the transaction based on a protocol associated with the second DLN and without using a private cryptographic key of the first account. The auditor computing node can set the second protocol (including a second set of rules) in the second DLN, which are different from the first protocol (including a first set of rules) associated with the first DLN. In the second DLN, the transactions do not need to be signed by the account owner using its private keys (or its private cryptographic key(s)). The auditor computing node can perform the action on the pre-determined number of tokens without using a private cryptographic key of the first account (or the second account). Specifically, the auditor computing node can, for example, initiate a transaction of a set of tokens from a first account to a second account by setting an origination address (e.g., "From" field) in the header of the transaction. The auditor computing node can set the origination address of the transaction to be different from the origination address of the first account holder, thus, alleviating the need of using the private cryptographic key of the first account. In other words, the auditor computing node can approve the transaction from the first account without an approval (or signature) from the account holder of the first account. In some instances, the auditor computing node can set the origination address of the transaction via a graphical user interface At 407, the method includes sending a signal indicating the transaction was authenticated. Once the auditor computing node determines or verifies information (including, but not limited to, the balance, the availability, and the limitations) of tokens in the first account, the auditor computing node can send a signal (e.g., an audit report) to indicate or authenticate the transaction to transfer the requested tokens from the first account to the second account, or other actions that the auditor computing node performed. In some instances, the auditor computing node can send a signal to indicate the status of the audit process.

At 409, the method includes storing information associated with the transaction in the distributed ledger data associated with the second DLN. In some implementations, the auditor computing node can store the information associated with the transaction in the second distributed ledger data associated with the second DLN and generate an updated copy of the second distributed ledger data including the second distributed ledger data and information associated with the transaction. In some instances, the auditor computing node does not store the information associated with the transaction in the distributed ledger data associated with the first DLN. In some instances, the auditor computing node can remove the distributed ledger data associated with the second DLN from its memory once the audit process is completed.

Embodiments described herein can be implemented by any entities aiming to explore the behavior of smart contracts, including, but not limited to, reviewing or auditing participant's transactions and accounts, penetration testing (a simulated cyber attack on a computer system, performed to evaluate the security of the system), and/or other system security testing. Thus, although some embodiments are described herein in the context of auditing transactions and accounts, it should be understood that such embodiments can also be used in non-auditing contexts such as penetration testing, etc.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
generating, based on distributed ledger data associated with a first distributed ledger-based network (DLN), distributed ledger data associated with a second DLN, the first DLN and the second DLN each being a fork, the distributed ledger data associated with the first DLN including account data associated with a plurality of accounts;
generating a request for a transaction between a first account from the plurality of accounts and a second account from the plurality of accounts;
authenticating the transaction based on a protocol associated with the second DLN and without using a private cryptographic key of the first account, the protocol associated with the second DLN being different from a protocol associated with the first DLN;
sending a signal indicating the transaction was authenticated; and
storing information associated with the transaction in the distributed ledger data associated with the second DLN.

2. The method of claim 1, wherein:
the transaction includes a transfer of tokens from the first account to the second account.

3. The method of claim 1, wherein:
the distributed ledger data associated with the first DLN include self-executing codes that are configured to be executed upon fulfillment of predefined rules that apply to the plurality of accounts.

4. The method of claim 1, wherein:
the request includes a header having an origination address different from an origination address of the first account.

5. The method of claim 1, wherein:
the information associated with the transaction is not stored in the distributed ledger data associated with the first DLN.

6. The method of claim 1, wherein:
the request is a first request including a first header having a first origination address associated with the first account,
the transaction is a first transaction,
the method further includes generating a second request to initiate a second transaction between the first account and the second account, the second request including a second header having a second origination address associated with the first account different from the first origination address.

7. The method of claim 1, wherein the authenticating the transaction is not based on an approval from an account holder associated with the first account.

8. The method of claim 1, further comprising:
generating an updated copy of the distributed ledger data associated with the second DLN, the updated copy of the distributed ledger data including the distributed ledger data associated with the second DLN and the information associated with the transaction; and determining an audit status of the first account based on the distributed ledger data associated with the first DLN and the updated copy of the distributed ledger data associated with the second DLN.

9. The method of claim 1, further comprising:

storing the information associated with the transaction as a state data storage overlay that is linked to the distributed ledger data associated with the second DLN; and not generating a updated copy of the distributed ledger data associated with the second DLN.

10. An apparatus, comprising:

a memory storing distributed ledger data including account data associated with a plurality of accounts at a first distributed ledger-based network (DLN); and a processor operatively coupled to the memory, the processor configured to:

generate distributed ledger data associated with a second DLN, the first DLN and the second DLN each being a fork, generate a request to initiate a transaction between a first account from the plurality of accounts and a second account from the plurality of accounts, process the transaction based on a protocol associated with the second DLN without a private key of the first account, the protocol associated with the second DLN being different from a protocol associated with the first DLN, determine an audit status of the first account based on the processing of the transaction, and send a signal indicating the audit status.

11. The apparatus of claim 10, wherein:

the transaction includes a transfer of tokens from the first account to the second account.

12. The apparatus of claim 10, wherein:

the protocol associated with the first DLN includes a rule in which a number of tokens is not allowed to be transferred out of the first account.

13. The apparatus of claim 10, wherein:

the processor is configured to store information associated with the transaction in the distributed ledger data associated with the second DLN;

the processor is configured to not store the information associated with the transaction in the distributed ledger data associated with the first DLN.

14. The apparatus of claim 10, wherein:

the request is a first request including a first header having a first origination address associated with the first account, the transaction is a first transaction, the processor is configured to generate a second request to initiate a second transaction between the first account and the second account, the second request including a second header having a second origination address associated with the first account different from the first origination address.

15. The apparatus of claim 10, wherein the private key is a private cryptographic key of the first account.

16. The apparatus of claim 10, wherein:

the processor is configured to generate and store a updated copy of the distributed ledger data associated with the second DLN including the distributed ledger data associated with the second DLN and information associated with the transaction.

17. The apparatus of claim 10, wherein:

the processor is configured to store information associated with the transaction as a state data storage overlay that is linked to the distributed ledger data associated with the second DLN;

the processor is configured to not store a updated copy of the distributed ledger data associated with the second DLN.

18. The apparatus of claim 10, wherein:

the distributed ledger data include self-executing codes that are configured to be executed upon fulfillment of predefined rules that apply to the plurality of accounts.

19. A processor-readable non-transitory medium storing code representing instructions to be executed by a processor, the code comprising code to cause the processor to:

generate, based on distributed ledger data associated with a first distributed ledger-based network (DLN), distributed ledger data associated with a second DLN, the first DLN and the second DLN each being a fork, the distributed ledger data associated with the first DLN include self-executing codes that are configured to be executed upon fulfillment of predefined rules that apply to a plurality of accounts;

generate a request to initiate a transaction between a first account from the plurality of accounts and a second account from the plurality of accounts;

process the transaction based on a protocol associated with the second without using a private encryption key of the first account, the protocol associated with the second DLN being different from a protocol associated with the first DLN;

determine an audit status of the first account based on the processing of the transaction; and send a signal indicating the audit status.

20. The processor-readable non-transitory medium of claim 19, the code further comprising code to cause the processor to:

store information associated with the transaction as a state data storage overlay that is linked to the distributed ledger data associated with the second DLN; and not store a updated copy of the distributed ledger data associated with the second DLN.

* * * * *